Oct. 30, 1951  E. G. SEGRE  2,573,069
METHOD AND APPARATUS FOR MEASURING STRONG ALPHA EMITTERS
Filed May 22, 1945
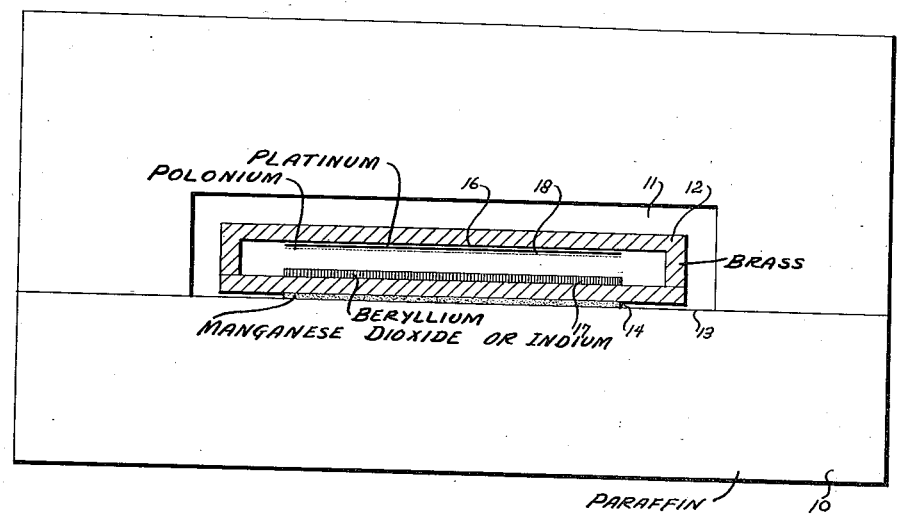
INVENTOR.
Emilio G Segre
BY

Patented Oct. 30, 1951

2,573,069

UNITED STATES PATENT OFFICE 2,573,069

METHOD AND APPARATUS FOR MEASURING STRONG ALPHA EMITTERS

Emilio G. Segrè, Santa Fe, N. Mex., assignor to the United States of America as represented by the United States Atomic Energy Commission Application May 22, 1945, Serial No. 595,193

2 Claims. (Cl. 250—83.6)

This invention relates to a method and apparatus for determining the strength of an alpha particle source.

Known methods and apparatus for determining the strength of an alpha particle source include either the use of an ionization chamber, a calorimeter, or a device which may be termed a demultiplier. When an ionization chamber is used to measure a strong source, objectionably high voltages must be applied thereto to obtain saturation current with the attendant possibility of break down occurring between the electrodes of the chamber. Calorimeter methods require delicate instruments for measuring temperature and elaborate apparatus for controlling heat transfer, substantial time durations being required to obtain the desired data. The calorimeter method is further objectionable since it detects not only the emitted or useful alpha particles, but also those having paths confined within the emitter material, and since these particles cannot be usefully employed, they should not be included in measurement of the emitter. The demultiplier method consists essentially of measuring only these particles radiating through a known small solid angle so as to decrease the intensity incident upon the detecting apparatus. When measuring a very strong source this apparatus is necessarily bulky and subject to error if contaminated. The above stated limitations and disadvantages of known methods of obtaining alpha source measurements are avoided in the present method as will be apparent from the following description.

A primary object of the invention is to provide a method substantially simplified in respect to known methods for determining the strength of an alpha particle emitter.

A further object of the invention resides in the provision of an improved method for measurement of a strong alpha source which permits relatively simple detecting apparatus, such as a Geiger-Muller counter, which is normally ineffective for such measurements, to be effectively employed for that purpose.

A more specific object is to provide a method which permits measurement of the strength of an alpha-emitter by means of a relatively simple device, such as a Geiger-Muller counter, which may be positioned adjacent the emitter during emission or at a point remote from the emitter at a time subsequent to the measured emission. The method involves subjecting a nuclear reactive substance to an alpha particle emission which is to be measured, employing the products of the nuclear reaction to establish radioactivity in a suitable material, and measuring radioactivity established therein, either during subjection to the products of nuclear reaction, or after removal of said material, following a predetermined exposure, to a point beyond the effective range of the products of nuclear reaction, as an indication of the strength of the alpha emitter.

Other objects and advantages of the invention will become apparent to persons skilled in the art upon examination of the drawing and description the inventive aspects of which are defined in the appended claims.

Referring to the drawing, which discloses a device incorporating the principle of the present invention, a thick walled enclosure 10 of paraffin or other suitable hydrogenous material completely houses, within chamber 11 thereof, a second enclosure 12, which may be rectangular in longitudinal section, preferably of a material of high atomic number, although materials relatively free of elements of low atomic number, such as brass can be used. Enclosure 12 is supported in spaced relation to bottom wall 13 of chamber 11 by an intervening monitoring material 14. Enclosure 12 completely houses a mounting sheet 16 upon which an alpha emitter 18 is disposed, sheet 16 being suitably attached to the upper wall of enclosure 12, and nuclear reactive material 17, which may be of planiform configuration, disposed in spaced relation to sheet 16, as by finding its support on the bottom wall of enclosure 12. Enclosures 11 and 12 are preferably of split construction, each enclosure comprising a base portion which provides a lower chamber wall upon assembly, and an upper channelled portion adapted to be supported thereon, said channel being centrally disposed to provide the upper and end walls, upon assembly, of a completely enclosed chamber.

Sheet 16 is preferably in the form of a foil of material inert to alpha emission, such as platinum foil, the alpha emitter 18 to be measured being substantially uniformly distributed over the entire exposed area thereof in a thin layer, as for example, by being sputtered thereon. Material 17 may be of beryllium or other material which emits neutrons when bombarded with alpha particles. Enclosure 12 serves the dual function of providing means for maintaining the alpha emitter in spaced relation to the nuclear reactive substance 17 and providing an effective barrier to confine alpha particles within the volume enclosed thereby. The function of enclosure 10 is to reflect, slow-down, or absorb neutrons which are radiated in random directions from the nuclear reactive substance 17. The function of monitoring material 14 is to provide an indication, through measurement of the radioactivity established therein, of the strength of the alpha particle emitter, hence this material may be manganese dioxide, indium, or other suitable material which becomes artificially radioactive upon exposure to neutron bombardment. Alpha particle emitter 18 may be of varying strength, but is preferably a strong source such as polonium, since the present method is particularly advantageous for measurement of strong sources.

In operation the alpha particles emitted from source 18 over a considerable area are radiated at random, a large portion of said particles bombarding substance 17 which is of sufficient area and in suitable spaced relation in respect to the distributed emitting material to promote such bombardment. As a result of the above described alpha particle bombardment of substance 17, neutrons are emitted therefrom in random directions in accordance with the nuclear reaction commonly designated $$Be^9 + He^4 \rightarrow C^{12} + n^1$$

Substantial numbers of neutrons initially traveling in, or reflected in a direction to enter monitoring material 14, establish radioactivity therein in accordance with the following known formulae; I for indium, and II for manganese:

(I) $\quad In^{115} + n^1 \rightarrow In^{116} \rightarrow Sn^{116} + e$ (II) $\quad Mn^{55} + n^1 \rightarrow Mn^{56} \rightarrow Fe^{56} + e$ The method of measuring the strength of any suitable alpha particle source is as follows. An alpha particle source of known strength is placed in the apparatus and after a measured time interval the source is removed and the radioactivity established in the monitoring material as a result of bombardment by neutrons emitted from substance 17 is measured by means of a suitable device such as a Geiger-Muller counter. Radioactivity induced in the monitoring material by an alpha particle source of unknown strength under exactly similar conditions is then compared with that induced by alpha sources of known strengths to obtain relative measurement of the strength of the unknown source. If convenient, the radioactivity established in the monitoring substance may be measured simultaneously by disposing a Geiger-Muller counter in proximity thereto. Radioactivity measured in the monitoring material must be corrected according to the known law for exponential decay of radioactivity therein, if an appreciable time delay exists between initiation of radioactivity in said material and measurement of said established radioactivity.

Alternatively, a Geiger-Muller counter for use as above may be constructed in a manner to permit direct indication of the intensity of neutron emission while eliminating the necessity of a separate monitoring material. Such a counter may include walls of a suitable material, such as silver, which is rendered radioactive upon neutron bombardment, or a portion or all of the inner wall surface of a conventional Geiger-Muller counter may be coated with suitable material such as indium or rhodium. In like manner, material which absorbs neutrons and immediately emits conversion electrons, such as cadmium or gadolinium may be employed as a counter wall coating.

What is claimed is:

1. A device of the character described having in combination, an alpha particle emitting material, said material being distributed in a thin layer over a substantial area, a second material capable of emitting neutrons upon bombardment by alpha particles from said first material, said second material being of planiform configuration, the area thereof corresponding generally to the area of said first mentioned material, and disposed in spaced relation to said first material within the effective range of alpha particles emitted therefrom, and a third material capable of becoming radioactively excited upon bombardment by neutrons emitted from said second material, said third material being of planiform configuration and of area corresponding to the area of said first and second materials and supported in spaced relation therewith beyond the effective range of alpha particles from said first material and within the effective range of neutrons from said second material.

2. A device of the character described having in combination, an alpha particle emitting material, said material being distributed in a thin layer over a substantial area, a second material capable of emitting neutrons upon bombardment by alpha particles from said first material, said second material being of planiform configuration, the area thereof corresponding generally to the area of said first mentioned material, and supported in spaced relation to said first material within the effective range of alpha particles emitted therefrom, and a third material capable of becoming radioactively excited upon bombardment by neutrons emitted from said second material, said third material being of planiform configuration and of area corresponding to the area of said first and second materials and detachably supported in spaced relation therewith beyond the effective range of alpha particles from said first material and within the effective range of neutrons from said second material.

EMILIO G. SEGRÈ.

REFERENCES CITED

The following references are of record in the file of this patent:

UNITED STATES PATENTS

| Number | Name | Date |
|---|---|---|
| 2,206,634 | Fermi et al. | July 2, 1940 |
| 2,220,509 | Brons | Nov. 5, 1940 |
| 2,288,718 | Kallmann et al. | July 7, 1942 |